Aug. 30, 1960 R. M. STEWART ET AL 2,950,998
APPARATUS FOR CONTACTING SOLIDS WITH LIQUIDS
Filed March 1, 1956 5 Sheets-Sheet 1

INVENTORS
Robert M. Stewart and
Wallace P. Sevin
BY
Mason, Kolehmainen,
Rathburn and Wyss,
Attorneys

Aug. 30, 1960   R. M. STEWART ET AL   2,950,998
APPARATUS FOR CONTACTING SOLIDS WITH LIQUIDS
Filed March 1, 1956   5 Sheets-Sheet 2

INVENTORS
Robert M. Stewart and
Wallace P. Sevin
BY
Mason, Kolehmainen,
Rathburn and Wyss.
Attorneys INVENTORS
Robert M. Stewart and
Wallace P. Sevin Aug. 30, 1960    R. M. STEWART ET AL    2,950,998
APPARATUS FOR CONTACTING SOLIDS WITH LIQUIDS
Filed March 1, 1956    5 Sheets-Sheet 5

INVENTORS
Robert M. Stewart and
Wallace P. Sevin
BY
Mason, Kolehmainen,
Rathburn and Wyss
Attorneys

United States Patent Office 2,950,998
Patented Aug. 30, 1960

2,950,998

APPARATUS FOR CONTACTING SOLIDS WITH LIQUIDS

Robert Marshall Stewart, New Orleans, and Wallace P. Sevin, Baton Rouge, La., assignors to Chemetron Corporation, a corporation of Delaware Filed Mar. 1, 1956, Ser. No. 568,741

34 Claims. (Cl. 127—7)

This invention relates to improvements in apparatus for contacting fibrous or agglomerated materials with liquids. More particularly, this invention relates to improved apparatus for extracting, leaching, washing, or otherwise treating solid materials of fibrous or agglomerated nature by conveying these materials continuously through a liquid medium, and it is especially valuable to enable controlled intimate counter current contact between such solids and liquids.

Spiral conveyors of conventional design have heretofore proved adequate for conveying only certain types of materials. In general, spiral conveyors, having flights of 180 degrees or more of rotation and a limited number of interruptions into which stops or projections are extended for breaking up or arresting spiral motion of the material being conveyed, proved adequate for finely comminuted, granular or otherwise slippery materials in either a dry state or wetted and conveyed through a liquid medium.

Devices of the type referred to have been heretofore employed in the extraction of sugar from sugar beets or in the extraction of oils from various seed materials, by the way of examples.

None of the foregoing spiral conveying arrangements is adapted to convey merely when wetted or when wetted and in liquid suspension, shredded, disintegrated, or otherwise prepared short lengths of highly fibrous and stringy materials. Among this latter class of materials, especially the reed or cane variety of plant life undoubtedly represents substantially as difficult a material to convey in wetted form by means of a spiral conveyor as any other natural or artificial fibers, and this is equally true whether the materials are merely wetted or are wetted and suspended in a liquid medium during the conveyance thereof. Other natural fibers which are not quite as difficult to spirally convey as materials in the class of sugar cane fibers, are wood fibers or agglomerated masses of such fibers in the form of pulp derived from woody materials.

Applicants have conducted extensive research on the problem of continuously conveying by spiral means, materials of this general class and have discovered a mechanical system of spirally arranged and interrupted conveyor flights of particular dimension in combination with a selected spaced arrangement of deflectors projecting into the spiral flight interruptions which has proved, in exhaustive tests, the ability to convey such highly fibrous and wetted materials continuously in a vertical direction.

It is accordingly the principal object of this invention to provide a combination of spirally arranged interrupted flights of particular dimension and pitch and selectively spaced deflectors extending into the interruptions, which combination readily permits of the continuous non-horizontal and upward conveyance of highly fibrous materials, whether wetted only or wetted and conveyed suspended in a liquid medium.

Another object of this invention is to provide apparatus in keeping with the foregoing object which is ruggedly dependable in operation and requires only a minimum initial investment, maintenance and personnel to operate.

Still another object of this invention is to provide apparatus of the character described which is adapted to operate efficiently in the extraction of sugar bearing juices from sugar cane, as well as in the extraction, leaching, washing, or otherwise contacting with liquid medium other fibrous materials.

These and additional objects and advantages will become more readily apparent as the following description proceeds, taken in conjunction with the accompanying drawings.

Referring now briefly to the drawings.

Figures 1, 2:
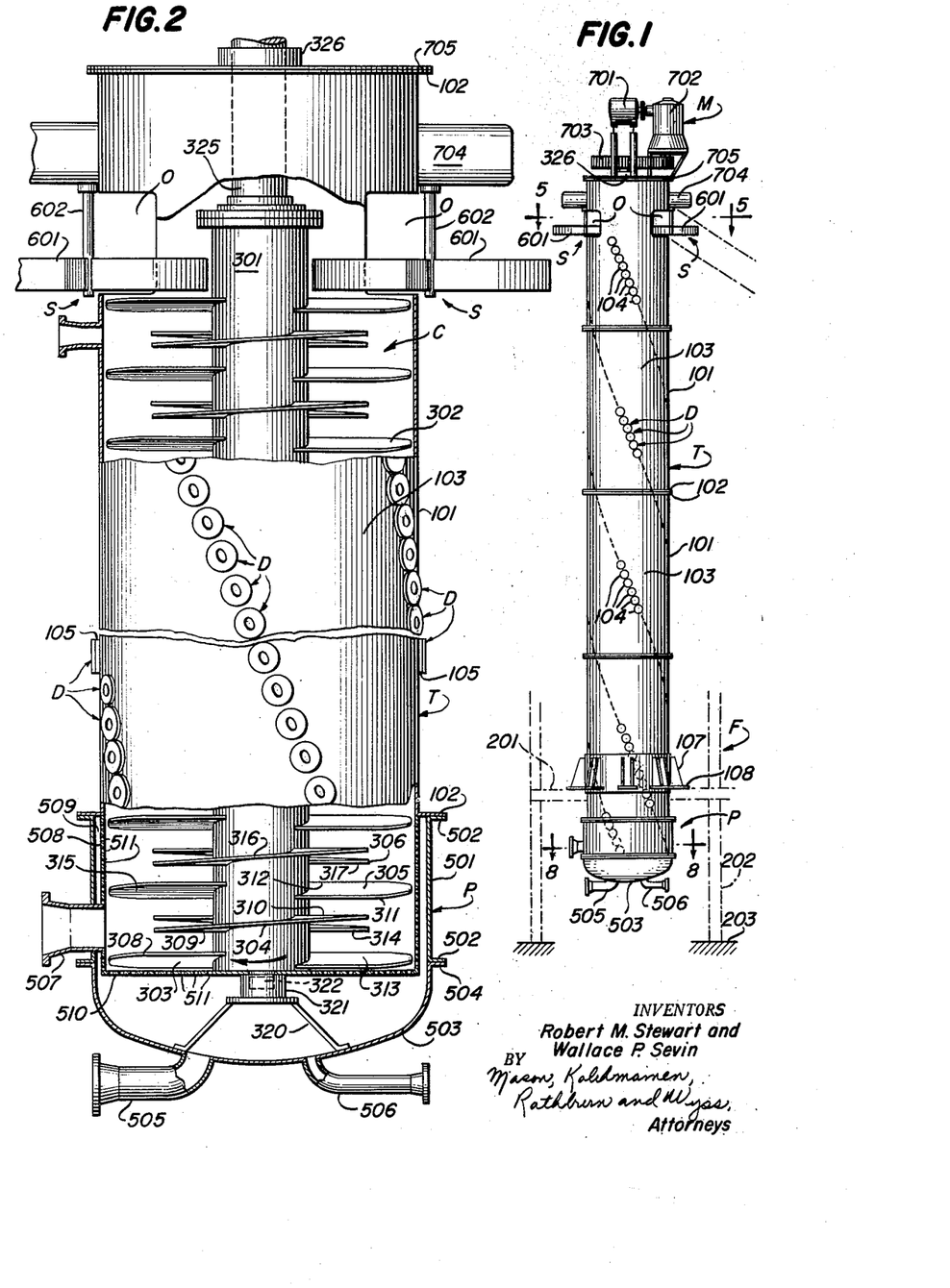
Fig. 1 is an elevational view of a tower or column incorporating the novel combination and arrangement of spirally arranged and interrupted flights of particular design and selectively spaced deflector elements extending into the flight interruptions.
Fig. 2 is an elevational view, partly in section, of the tower illustrated in Fig. 1, with portions cut away to show the novel spirally arranged interrupted flights.

More specifically with respect to Figs. 1 and 2 of the drawings, letter T indicates a cylindrical steel tower or envelope which, for simplicity of fabrication, may be formed in sections terminating in end flanges by means of which the individual sections may be secured together by conventional means such as bolts. Obviously, any other means for connecting the sections one to another may be utilized, such as for example, welding. The tower T is supported near its lower end by laterally projecting struts secured to the walls of the tower and resting on a pedestal or base framework F. The base framework F is, of course, adequately secured to and supported by foundation material, not shown, and may extend upwardly beyond the level of the strut members to provide a multiple level scaffolding or platform supporting framework for ready access to the entire length and circumference of the tower. From the lower end of the tower and forming a part thereof is suspended a removable section of pan P, which houses a screening arrangement and guide bearing, and is further provided with inlet and outlet conduits, all of which will be more particularly described below.

Within the cylindrical tower or envelope T there is journalled for rotation a specially designed spiral material conveying device or modified scroll conveyor C, the flights of which are secured to a central shaft. The rotating spiral conveying device C is rotated by suitable motivating means M, including gearing and the like which is located preferably at the top of the tower T. In the walls of the tower T above the uppermost flights of spiral conveyor C are provided discharge openings O, within which openings discharge means in the form of sweeps S are provided for removing the exhausted raw material from the tower after it has been injected into the tower T at the bottom an conveyed upwardly therethrough by means of the conveyor C through a liquid medium.

At selectively spaced locations in the tower walls there are provided a series of deflector elements D which are secured to and project inwardly from the walls of the tower into the interruptions in the arrangement of flights of the spiral conveyor C.

In greater detail the tower T as illustrated in Fig. 1 is made up of a series of hollow cylindrical sections 101 terminating at either end in external flanges 102 for joining the sections together by conventional means such as bolts not shown. The walls 103 of the tower are provided with a plurality of apertures 104, each of which is circumscribed by a flat reinforcing collar or ring member 105, which is secured to the walls 103 of the tower preferably by a fillet weld about its periphery. In this manner the wall portions of the tower about the apertures are reinforced and each of the apertures or holes 104 is provided with a flat circular door for receiving the deflector elements D to be described below. The apertures 104 are arranged in the walls of the tower T in such a manner that as illustrated in Figs. 1 and 2, for example, there are four apertures per flight interruption of the internal spiral conveying device C, and these are spaced radially apart 90 degrees from one another. The apertures of adjacent levels, in addition to being spaced from one another longitudinally, are also displaced radially from adjacent apertures in the adjoining levels. A convenient and highly efficient arrangement of these apertures 104 for receiving the deflector elements D, to be described later, has been found to be in the form of spaced spirals. The apertures 104 in the device illustrated in Figs. 1 and 2 are arranged in four spirals of approximately one complete turn each. It should be understood, of course, that this particular arrangement is not absolutely necessary. It is imperative however, that the apertures of adjacent levels are radially spaced from each other and, therefore, arrangements other than spirals, such as for example, a zig-zag arrangement, is operative. It is a desideratum to insure that apertures for deflectors D in adjacent levels are not substantially vertically disposed one over the other.

Near the lower end of the tower T but above the removable pan portion P, there are located a plurality of radially extending finlike struts 107, each of which is provided with a suitable base plate 108. These struts 107 and their respective base plates 108 may be secured to the tower wall 103 by any suitable means, such as for example, fillet welds. The base plates 108 are arranged to rest upon cross girders 201 of the tower supporting framework F. The cross girders 201 are, in turn, secured to and supported by upstanding legs 202 of the framework. The legs 202 are preferably arranged at the corners of a square or rectangle as may be desired, which circumscribes the tower T. The legs 202 of this supporting framework F are, of course, anchored to and rest upon suitable foundation or footing material schematically shown at 203 which is preferably of steel reinforced concrete and may take the form of individual pillars or a concrete mat, depending upon the type of terrain upon which the tower is erected. The legs 202 of the framework F may conveniently extend upwardly in distance above the tower supporting girders 201 and preferably extend the full length of the tower so that, with suitable additional cross girders, not shown, a platform or scaffold supporting skeleton structure is provided about the tower. Platforms or scaffolding at various levels may be thereby more or less permanently provided, together with steps or ladders for easy access to various levels of the tower, for inspection purposes, maintenance, and the location of certain controls. The particular type of surrounding skeleton supporting structure is, of course, a matter of choice and forms no substantial part of the invention, and may be fabricated according to established structural standards for the particular sizes, weights, and various external atmospheric conditions encountered at the specific location of any tower.

As stated before, the lower end of the tower is provided with a removable pan element P, which will not be described in detail here, as it would appear more appropriate to describe it together with the motivating means M located at the top of the tower T, after the internal spiral conveying device C is described in connection with the cooperating deflector elements D, which are positioned in the apertures 104 provided therefor in the walls 103 of the tower T.

Figure 7:
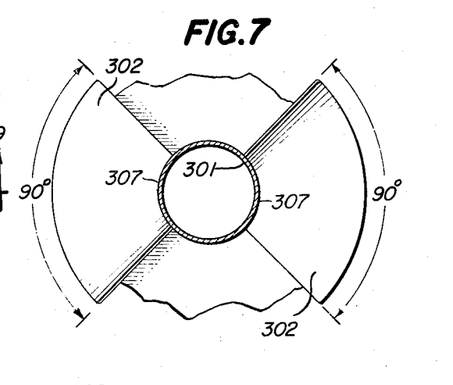
Fig. 7 is a sectional view of an intermediate flight level of the apparatus illustrating a single level section of the spirally arranged flights or scroll, the shell and projections being omitted for clarity.
Figure 8:
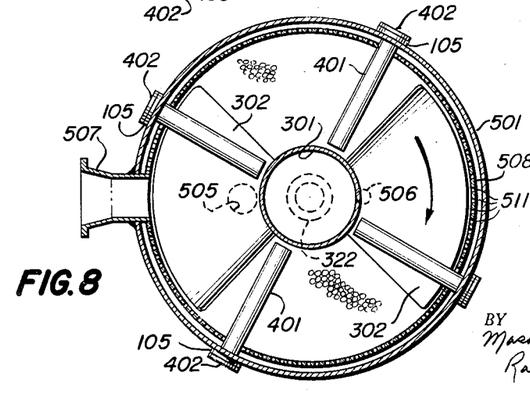
Fig. 8 is a sectional view taken on line 8—8 of Fig. 1 and illustrates the lowermost flight level of the apparatus, and the screening arrangement for drawing off or continuously removing liquid from the tower. The deflectors located immediately above that flight lever are also illustrated here.

Journalled for rotation within the tower T is an interrupted flight, stepped spiral conveying device C of unique design. This device is especially well adapted to convey solid chipped or cut fibrous or agglomerated materials introduced near the lower end of the tower T through a liquid medium. In the case of sugar cane, such medium is usually hot water. The spiral conveying device C comprises a central tubular shaft 301 of substantial diameter which in the embodiment illustrated is approximately one-third the diameter of the tower T. About the central shaft 301, flight sectors 302 of the spiral conveyor C are affixed in any suitable manner such as by welding in a stepped and interrupted spiral arrangement of flight sectors in single or multiple helix combinations. This is best illustrated in Fig. 2 wherein one spiral arrangement may be readily traced in sectors 303, 304, 305 and 306. It should be noted that as illustrated in Fig. 7, the flight sectors 302 are each one-quarter or ninety degree circular segments, the internals 307 of which are arcuate and have a radius complementary to the radius of central shaft 301.

The pitch of the flights 302, that is, the angle of the flights to the horizontal, may vary from zero degrees to about thirty degrees. Small angles of from one-half degree to six degrees have been found to be preferable for highly fibrous material such as sugar cane. The efficiency of the flight angle depends on the size of the tower. Larger towers, that is towers T of a diameter of one hundred or more inches may operate efficiently with a small angle of a fraction of a degree. More important than the flight angle is the total absolute elevation of the flight between its leading edge and its trailing edge at the outside periphery of the scroll. It has been found that this elevation should be in the range of three to six inches with materials such as, for example, sugar cane. It is therefore seen that in a larger spiral device C, the flight angle can be smaller and still provide an elevation of the range stated above.

The flights are in the form of sectors of a helix having a diameter slightly less than that of the diameter of the tower. Sectors of ninety degrees are preferred for flights 302, but it has been found that sectors from thirty degrees to somewhat less than one hundred eighty degrees are operative in cases of two or more helices. The size of the flights depends upon the number of helices in the scroll. With a single interrupted helix for example, the flights could be 180° or more. The angle of the flight sector is equal to one hundred eighty degrees divided by the total number of stepped helices on the spiral device C. Thus in a device having two helices the angle of the flight sectors is ninety degrees; in one having four helices the angle of the flight sectors is forty-five degrees. The number of flights at any given level on the rotor must not be greater than the value obtained by dividing one hundred eighty degrees by the angle of the flight sectors. For instance, not more than two ninety degree flights or four forty-five degree flights may be attached to the rotor at the same level. From the foregoing it follows that the number of helices is equal to the number of flights per level. If the design of the spiral rotation device C does not correspond to the formulas given above, the scroll will pack with material and will be inoperative. In the device illustrated in the drawings there are two ninety degree flights attached to the shaft 301 on opposite sides thereof, there being two helices in the scroll.

The stepped and interrupted helicoid is obtained by longitudinally spacing the leading edges of one flight from the trailing edge of the flight segment forming the next portion of the same stepped helix of flights. By way of example, the leading edge 309 of flight 304, that is, the edge which leads as determined by the direction of rotation of flights 302 (see directional arrow on shaft 301, Fig. 2), is directly above the trailing edge 308 of flight 303. Likewise, the leading edge 311 of flight 305 is spaced above the trailing edge 310 of flight 304, and the leading edge 317 of flight 306 is over the trailing edge 312 of flight 305. Thus, one complete turn, three hundred sixty degrees, of the stepped helix is formed of four ninety degree segments or flights 302. The longitudinal spacing between flights is such that a deflector D to be described in detail hereinafter may project thereinto at any angle of rotation about its own longitudinal axis. This arrangement is continued the full length of the spiral device C. Furthermore, in the embodiment illustrated, the spiral device C takes the form of a double helicoid and therefore oppositely disposed on shaft 301 from the flights such as 303—306 forming part of the first helix traced are complementary ninety degree sectors or segments such as 313, 314, 315 and 316, forming one complete turn of the second helix of the spiral conveyor C.

The oppositely disposed but complementary flight segments 302 of the two helices of the device C are of equal pitch and direction and as device C is designed to carry solid or agglomerated material upwardly through liquid media in the cylindrical envelope 103 relative rotation must be such between the flights and the shell that the leading edges of the flight segments are disposed lower than the trailing edges. Taking a hypothetical parcel of material, it will be moved upwardly by the flights of both helices as the leading edges are all at a lower level than the respective trailing edges. Additional convolutions of spiral device C continue as indicated at the upper again broken away portion of the tower T (Fig. 2).

The spiral device C is journalled for rotation within and parallel to the sides of envelope 103 and this may be conveniently effected by means of a spider arrangement 320 at its lower end secured to pan P, the spider or guide arrangement having a suitable central guide bearing 321 to house a reduced lower end portion 322 of shaft 301. At its upper end, a reduced portion 325 of the shaft 301 is housed in a central main thrust bearing 326 located on a cover and supporting plate 705. The plate 705 is affixed to the upper flange 102 of the top cylindrical section 101 by any suitable means such as bolts, not shown, and serves the following purposes. It closes the top of the envelope 103 from the atmosphere, serves as a thrust bearing support for the upper reduced end 325 of shaft 301 and also supports the motivating means M mounted thereon.

Figure 3:
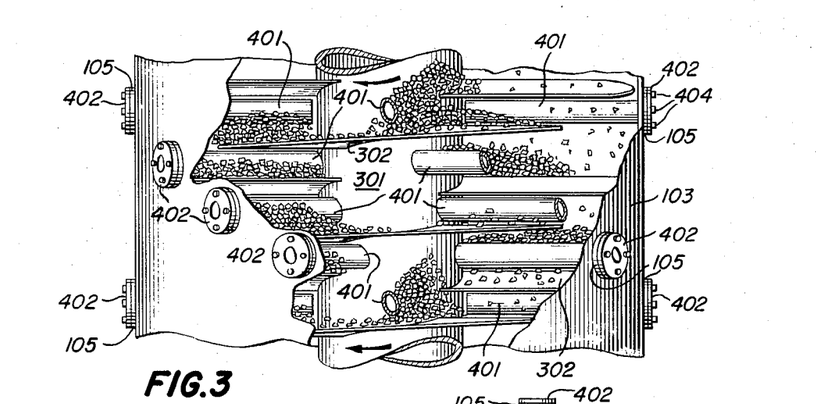
Fig. 3 is a perspective view of a section of the tower illustrated in Fig. 1, again cut away to show in greater detail the combination of spirally arranged and interrupted flight segments and selectively spaced intervening deflectors, illustrating its operation in connection with a load of disintegrated highly fibrous material.
Figure 9:
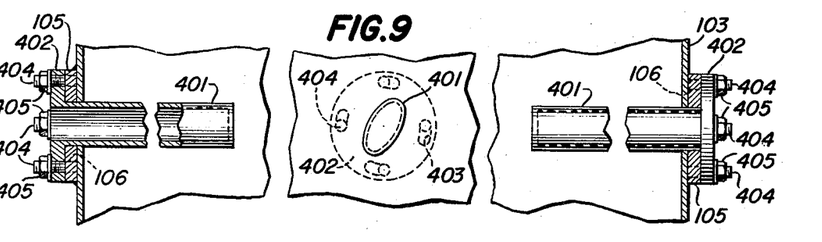
Fig. 9 is a fragmentary elevational view, partly in section, taken on line 9—9 of Fig. 6.
Figures 10, 11:
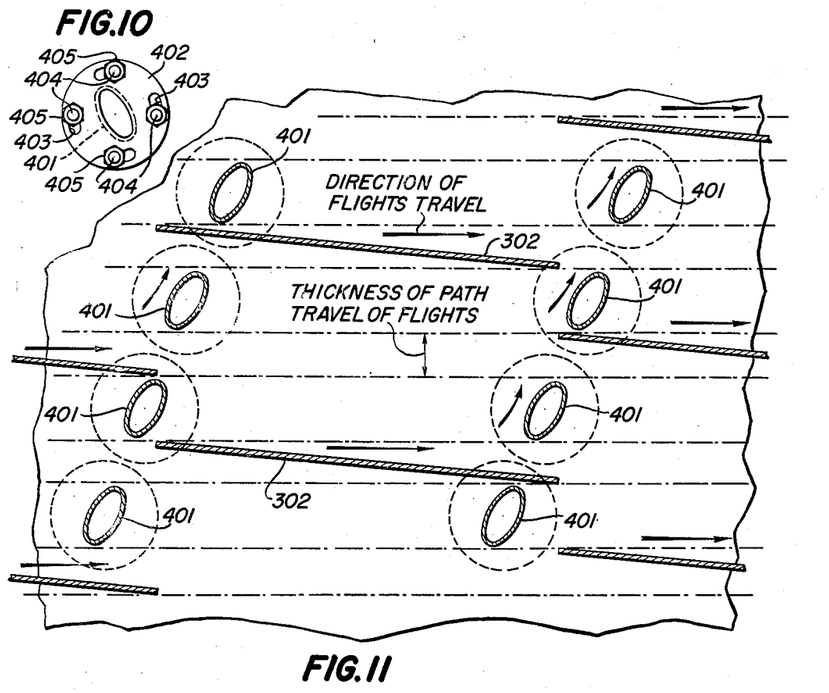
Fig. 10 is an elevational view of the external flange arrangement of one of the projections or deflecting elements.
Fig. 11 is a schematically developed view illustrating the co-action between the spirally arranged flight elements and the selectively spaced intervening deflector elements of the particular apparatus disclosed in the foregoing figures.

Returning now more specifically with respect to deflectors D, a stationary multiple helicoid, interrupted and stepped spiral device is provided in the form of the plurality of deflectors D affixed to the envelope 103 of tower T, and projecting radially inward therefrom. These deflectors D in a plurality of spiral patterns extend into the interruptions between oppositely disposed pairs of flight sectors 302 of the spiral conveyor C. The structure of deflectors D is best seen in Figs. 3, 9 and 10 and, in the embodiment illustrated, comprises an armlike body portion 401 longitudinally of uniform width but having opposite convex surfaces such that in cross section they are substantially ellipsoidal in form (see particularly Fig. 3). In length, body portions 401 extend approximately from the envelope 103 to adjacent the shaft 301 permitting only a minimum necessary clearance therebetween.

The outer end of the arm portion 401 terminates in a flange 402 which corresponds in size to the reinforcing collars 105, the latter circumscribing the apertures 104 in the walls 103 of tower T. The flange 402 is provided with four or more equally spaced arcuate slots 403 for adjustably receiving bolts or studs 404 which may engage tapped holes 106 in the collars 105 or may be welded to the collars 105. In this manner the angle of attack of the body portion 401 of the deflectors may be adjusted about thirty degrees by merely loosening the nuts 405 on the bolts or studs 404, rotatably adjusting the flange 402 and again tightening the nuts 405 without removing the deflector D. If a greater adjustment is desired, nuts 405 may be removed and the flange rotated ninety degrees or a multiple thereof and again secured.

As observed in Fig. 9, the deflectors D may be formed with hollow body members 401, or they may be solid. It is preferable that the deflectors be hollow and the outer end provided with a removable plug, not shown. In this manner with additional small apertures, not shown, through the walls of portion 401, samples of liquid may be withdrawn from the interior of the tower T through the opening closed by a plug, not shown, or other media introduced therethrough into the tower. It is apparent that the deflectors D can be fabricated in parts or cast in one piece. A cast version with open outer ends is illustrated in the center of Fig. 9 to show the angle of attack at which the body portions 401 of the deflectors D are set.

Although the pitch of the spirals of deflectors D is substantially greater than the pitch of the stepped flight spiral of the conveyor device C, the pitch of the individual deflectors need not be as great and may be set at any suitable lesser pitch. Conceivably for control purposes, in certain circumstances they might even be pitched in the same direction as the pitch of the flights of the spiral rotating device C. Normally, however, it is to be understood that regardless of the degree of pitch of deflectors D, they are generally pitched opposite to the pitch direction of the device to obtain maximum relative counter rotation and material lift.

If non-open end deflectors are employed, a fin or ear may be arranged in alignment with the body portion 401 so that the pitch or angle of attack of the latter can be readily judged at a glance by the external position of the ear. As tower T contains a liquid medium, a suitable washer or sealing medium or gasket is provided between wall collar 105 and deflector flange 402.

In practice it has been found desirable to pitch deflectors D at angles of from approximately zero degrees to sixty degrees from the horizontal and preferably at forty-five degrees but this may be varied in the range from a pitch equal in magnitude to the approximate 1:6 pitch of the spiral conveyor device C to a pitch somewhat less than vertical. At a vertical pitch, no auxiliary and complementary transport effect or lift can take place and only turbulence and retardation of spiral material movement is accomplished.

In this manner, although the envelope 103 is stationary, it, together with deflectors D positioned in their respective stations or apertures 104, constitutes a female counter spiral device having rotation relative to the spiral conveyor device C. By maintaining one of the spiral devices stationary and normally of opposite pitch and less than the vertical, not only is sufficient turbulence created tending to further maintain the material to be transported in a uniform suspension, but an aiding longitudinal direction of movement or auxiliary transport and lift of the material is also obtained.

As this concept is considered to be broadly new in the conveyance of solids through liquid media, applicants consider and include as within the scope of the appended claims the concept that either the male or the female spiral might be rotated, while the other remains fixed, or the movement of both simultaneously.

The lower end of the tower, as stated before, is provided with a pan P comprising a shell 501 secured to the lowermost section 101 at its lower flange 102, preferably by means of a flange 502 and bolts, not shown. The pan bottom 503 generally takes the shape of a dished or otherwise formed member and is secured by an upper flange 504 to a lower flange 502 on the pan shell 501. The supporting spider 320 for the guide bearing 321 to receive the reduced bottom end 322 of the spiral conveyor shaft 301 and previously referred to, is secured by any suitable means inside of and to the pan bottom of sides 503, by any suitable means such as, for example, welding. From the bottom of the pan in the device illustrated and in communication with the interior of the pan 503 are secured two conduits 505 and 506. The conduit 505 is preferably of larger diameter and capacity than conduit 506 and is provided for connection to a line for carrying off the heavier liquid medium, which has decanted to the bottom of the tower, to processing or reprocessing destination. The conduit 506 is provided in the event that it is desired to withdraw from the bottom some of the heavier liquid medium which has so gravitated for recycling into and with further raw material before the latter is introduced or injected by pumping into the tower T through a conduit or port 507, which will be described shortly. The pan shell 501 is of slightly greater diameter than the envelope 103 of the tower itself. The walls 501 of the pan P end in a flange 502 by which the pan P is attached to the lower flange 102 of the tower T. Within the shell portion 501 of the pan P, and substantially as an extension of the tower walls 103, is provided a hollow cylindrical screen member 508. This screen 508 is arranged in such a manner that there is an adequate chamber 509 between the screen 508 and the pan P into which the screened liquid medium or liquor at the bottom of the tower may accumulate for withdrawal through conduits 505 and 506. Below the lower set of flights 303 and 313 on the spiral conveying device C, a circular horizontal bottom screen 510 is provided, which, at its periphery is secured or welded to the base of the side screen 508 and is provided with a central opening through which the reduced shaft 322 of the spiral conveyor device C extends. The cylindrical vertical side screen 508 and flat bottom screen 510 are provided with holes or perforations 511 which taper from a smaller internal diameter to a larger external diameter. This is important to insure adequate withdrawal of the heavier liquid medium in the bottom of the tower and reduce clogging to a minimum. The number and size of perforations 511 in the screen will be governed of course by the characteristics of the particular solid, fibrous or agglomerated materials being conveyed through the liquid medium, as well as the expected gravity of the liquid medium itself. By the same reasoning, the total area of screening surface will also vary with and be dependent upon the characteristics of the material and the gravity of the liquid medium involved. In the device illustrated it has been found preferable that the side screening 508 extend a distance equal to approximately four times the distance between consecutive flight levels of the spiral device C. It is also preferable that the flight segments at the lower end of the spiral conveying device C, and which rotate within the screened area, extend closely adjacent to the screen surfaces 508 and 510 so as to effect a cleaning action thereon and in effect act as doctor blades. It will be appreciated that the type and thickness of the material used for the screening will also depend upon the specific application, and if extremely thin gauge screening material is used, additional backing or reinforcing members between the screen and the pan and sidewalls are required. However, it should be noted that the pressures exerted against the screen surface within the pan area are substantially equalized on either side of the material, so that the screening is seldom subjected to any great stresses or pressures. It will be appreciated that the entire screen surfaces 508 and 510, perforated at 511 may be provided in the form of a unitary and replaceable basket.

The inlet orifice or conduit 507 extends through the shell portion 501 of the pan P and terminates in an aperture in the cylindrical screen 508, so that material introduced through this conduit 507 enters directly into the interior of the tower T and is immediately subjected to the conveying action of the spiral conveying device C.

At this point it might be well to indicate that the material to be conveyed through the tower T by the spiral conveying device C may be injected into the bottom of the tower through this inlet port 507 by any suitable injection means. It has been found that if the solid, fibrous or agglomerated material is mixed with and suspended in a portion of the liquid medium, such as may be withdrawn through conduit 506, heated and reintroduced through the inlet conduit 507, it may readily be introduced into the bottom of the tower by means of a conventional rotary pump preferably of the open impeller or non-clogging type.

At the top of the tower T and above the uppermost of the flights 302 of the spiral conveyor device C, there may be provided one or more openings O in the tower walls 103. These openings may be of any convenient size and provide discharge exits for the material after it has been conveyed upwardly through the entire length of the tower T in contact with the liquid medium therein.

Figure 5:
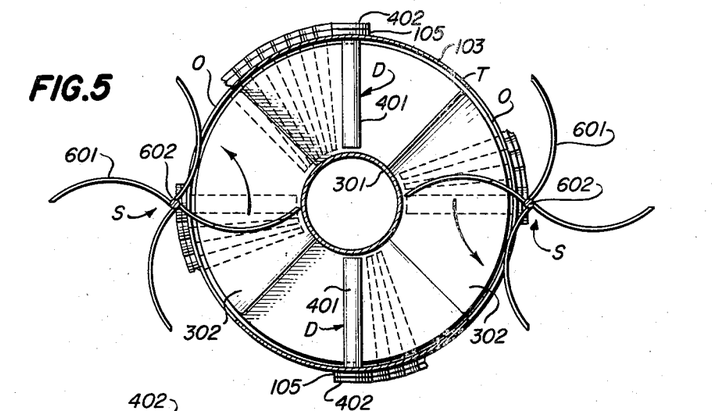
Fig. 5 is a sectional view taken on line 5—5 of Fig. 1 illustrating the uppermost flight and deflector level and rotating sweep arrangement for the discharge of material after it has been conveyed upwardly through the length of the circumscribing tower.
Figure 6:
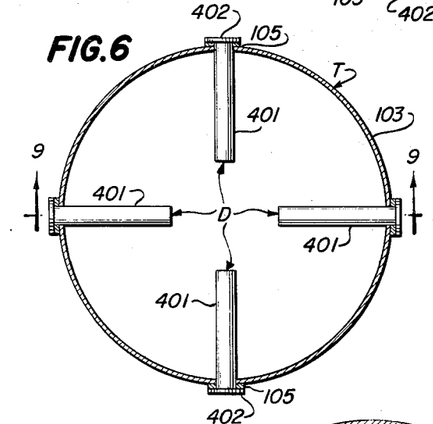
Fig. 6 is a cross sectional view at an intermediate deflector level of the tower illustrating the manner in which the deflectors extend inwardly from the circumscribing shell or tower with the spiral flight arrangement omitted for clarity.

It has been found preferable to implement the discharge of the material from the top of the tower by means of a rotary sweep having from two to four sweep arms 601 and operaing from a central shaft 602, mounted for rotation externally of the outer walls 103 of the tower T, and parallel with the axis of the main scroll shaft of the spiral conveying device C. The sweep arms 601 are preferably curved concave to the direction of rotation, and are in length adequate to extend from the shaft 602 into the tower through the openings O to closely adjacent the central shaft 301 of the spiral conveying device C. The opening to accommodate such a sweep will generally require an opening of approximately ninety degrees of the curvature of the shell walls 103, and in height two or three times the height of the sweep arm 601. As illustrated in the section in Fig. 5, two sweeps such as just described are operating on opposite sides of the tower T. Obviously other discharge means may be provided and in certain instances continuous helical scrolls may be provided for this material removal.

The cylindrical spiral conveying device C is rotated by means of a motivating device or motor M, which is mounted on the top cover plate 705 of the tower T. Such a motor 701 activates and rotates the spiral conveying device C through a mechanism such as a gear reducer generally shown at 702, and additional gearing 703, the latter being connected to the upper reduced end 325 of the central shaft 301 of the spiral conveyor C. Obviously, the gear reducer or transmission 702 may be of any suitable type, and it is preferable that this reducer be in the form of a fluid coupling so that an infinite variety of speeds may be readily attained through remote controls connected thereto.

The discharge means S could, of course, be operated by take-off gearing and shafts from the main driving motor 701, but for convenience it has been found preferable and more practical to provide each of the sweep units with its own driving motor 704 connected through an appropriate reducer, to the sweep shaft 602.

A more complete understanding of the invention will be had from a description of its operation. The fibrous or agglomerated solid material is first comminuted and preferably suspended in a portion of the liquid medium withdrawn from the tower T through conduit 506 provided for that purpose. This may be accomplished readily in a mixing tank, not shown, provided with conventional power operated stirring apparatus or the like. In the case of sugar cane, the heated suspension of cane chips and juice is drawn from the mixing tank and passed to the inlet orifice 507. As stated before, this may be accomplished by any suitable injection means and it is preferable to utilize a conventional centrifugal pump, not shown, of suitable capacity and design. In the case of the sugar cane chips, such a pump with an open impeller has been very successfully employed.

The material to be conveyed through the liquid medium and suspended in a recycled portion of the liquid medium as just described, is thus injected through orifice 507 into the lower portion of the tower T through the screen 508. At the same time liquid medium may be continuously introduced into the top of the tower. The rate of introduction of the suspended solid material to be conveyed through the tower and the introduction of liquid medium at the top of the tower is correlated and may be automatically controlled by automatic weighing and controlling apparatus available commercially for such purposes. The suspended material enters into the spaces between the flights of the spiral conveying device C, which is being slowly rotated in a clockwise direction by the motor means M (see Figs. 2 and 3). As the leading edges of the flights 302 are pitched lower than the trailing edges, the material is elevated by the action of the inwardly projecting deflectors D.

The deflectors D as described before, being pitched oppositely to the flight sectors 302, cause the material to be further elevated and to be picked up by the leading edges of the next level of flight sectors 302. In this manner the suspended material is moved upwardly in a slowly ascending spiral motion through the liquid medium in the tower. It will be apparent that, depending upon the purpose for which the material is being conveyed through the liquid medium, it will be washed and leached. In the case of sugar cane chips, sucrose will be diffused from the cells by dialysis and liquid medium will be infused into the cells by osmosis. The material so washed, leached or diffused from the material being conveyed may dissolve in the liquid medium, if the latter is chosen for its solvent properties with respect to the particular solid material being conveyed and its density thereby increases. The more dense liquid media accumulate at the lower end of the tower for obvious reasons, first of course, being that the liquid as it concentrates gravitates downwardly, and second, because the fresh solid material is being introduced at the bottom of the tower, greater amounts are immediately washed, leached or diffused in the area of initial contact with the liquid media. A third reason, in the operation suggested herein is, of course, because the fresh material is initially suspended in a recycled portion of the already concentrated liquor or liquid medium from the pan portion of the tower.

As the spiral conveying device C slowly rotates and conveys the suspended solid fibrous or agglomerated materials upward through the liquid media, the material is placed continuously in contact with liquid of less and less concentration, whereby, because of the laws governing dilution or the laws governing the interfacing of liquids of different densities, the dynamic forces tend to carry the materials of higher concentration into the liquid media of less concentration so that increasingly greater total percentages of materials have been washed, leached, dissolved or diffused from the solid materials as it moves toward the upper end of the tower where the fresh solvent or liquid medium is being introduced.

The length of the tower and speed of rotation of the spiral conveying device for any given diameter unit determine the quantity of material that can be conveyed through the tower per unit time, and although the tower be initially designed in height for a specific material or group of materials to be treated therein, a great degree of latitude may be had for different materials in this type of device in that the contacting time may be varied up or down by the adjustment within limits of the speed of rotation of the spiral conveying device C. The relationship is, of course, direct as will be apparent, so that throughput varies directly with the speed of rotation of the spiral conveying device C, and the contacting time varies inversely with the speed of rotation of the spiral conveying device C.

The solid materials in suspension ultimately reach the uppermost flights of the spiral conveying device C, at which time due to the correlation of the height of the tower, the liquid media therein, and the speed of rotation of the spiral conveying device C, the solid materials are satisfactorily washed, leached or diffused as the specific case may be, and are ejected from the tower through the exit or ejection ports O by the sweep means S.

In Fig. 11 there is schematically illustrated in a developed view, the cooperation of the flights 302 and deflectors 401 in the elevation of material therein.

Figures 4, 12:
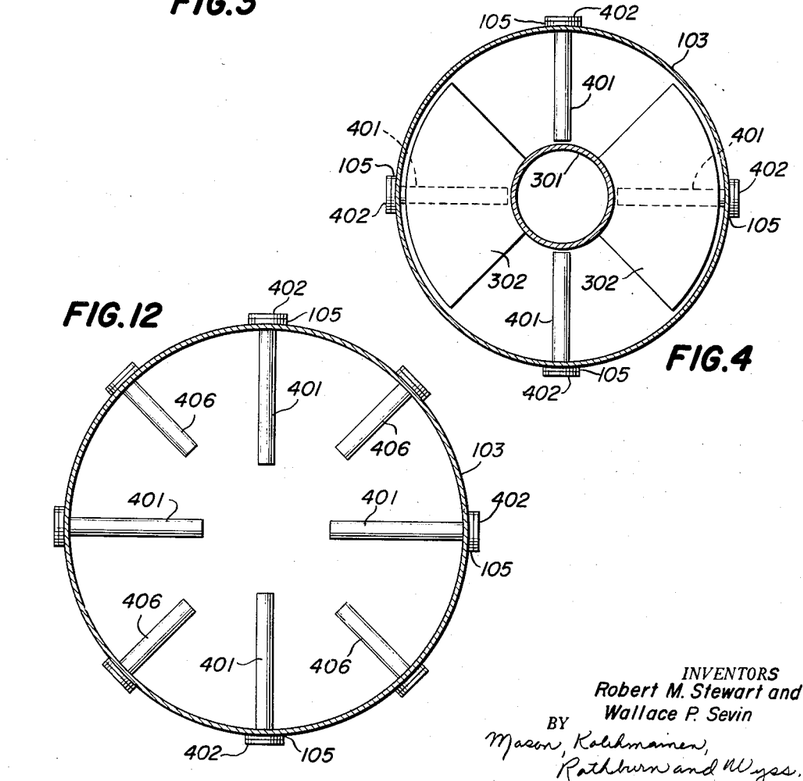
Fig. 4 is a plan view of Fig. 3 illustrating a typical flight and deflector level of the apparatus.
Fig. 12 is a sectional view taken on any intermediate deflector level, illustrating an increased number and arrangement of deflectors as utilized in a tower of larger dimensions than that illustrated in the previous views, the spirally arranged flights or scroll being omitted for clarity, it being understood that the flight arrangement of the scroll elements is the same as that illustrated in Figs. 2, 3, 4, 5, 7 and 8, except for corresponding enlargement in dimension to correspond to the enlarged diameter of the tower illustrated in this view.

In Fig. 12, there is shown a horizontal section through a tower of increased diameter over that in the principal embodiment illustrated. Here again the tower walls 103 are as described above but of heavier material to withstand the greater hydrostatic and supporting forces involved. The reinforcing collars 105 are likewise of increased thickness to provide adequate support for the longer deflector bodies 401 which as before, project in from the tower walls 103 to just adjacent the shaft 301, The deflector bodies 401 are also provided with similar complementary flanges 402 and are secured in the same manner to collars 105. In a tower T of approximately ten feet in diameter, four deflectors D having bodies 401 are employed per flight interruption, between which are provided another set of four deflectors having shorter bodies 406 extending only about half or two-thirds the distance between the tower walls 103 and central shaft 301.

Figure 13:
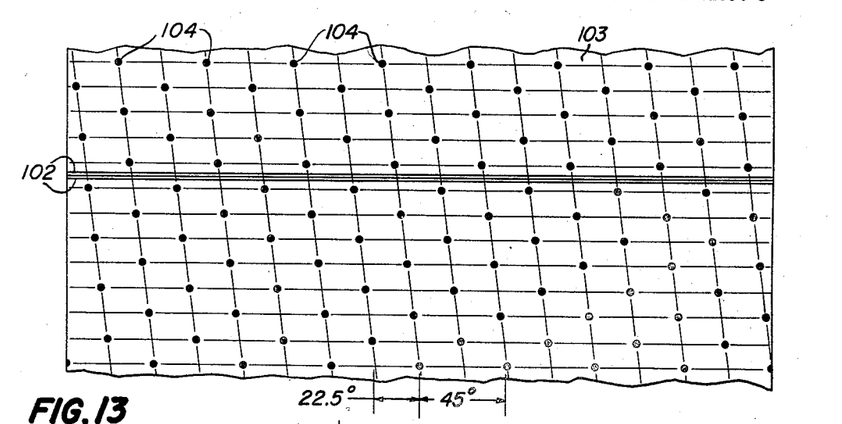
Fig. 13 is a developed view schematically illustrating a layout of the centers for the apertures in the tower shell to receive the deflectors on each level between the flights of the spiral itself, and as illustrated in Fig. 12.

Fig. 13 illustrates in developed view a layout of centers for apertures 104 in the tower walls 103 to receive the deflectors D. The staggered relationship for the deflector ports or stations 104 may also be utilized in towers of greater or smaller diameters.

Figure 14:
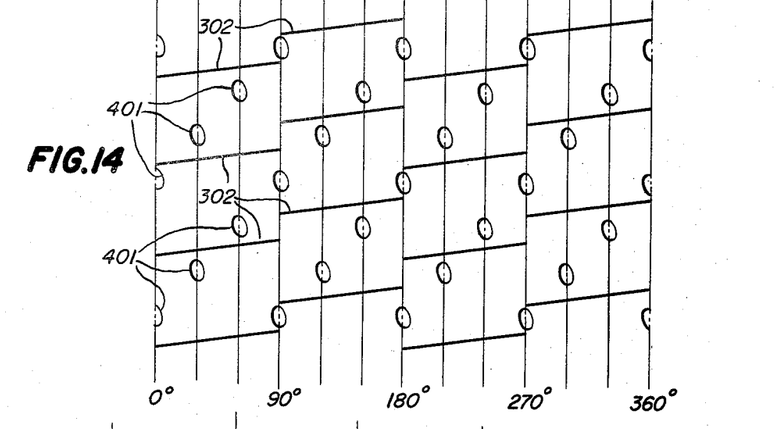
Fig. 14 is a developed view schematically illustrating the deflector elements in a tower which in size is intermediate to that illustrated in Fig. 1 and that of Fig. 12, and in which four deflectors are utilized per deflector level between the spirally arranged flight elements, this view having the relative positions of the flight elements with respect thereto also illustrated schematically.
Figure 15:
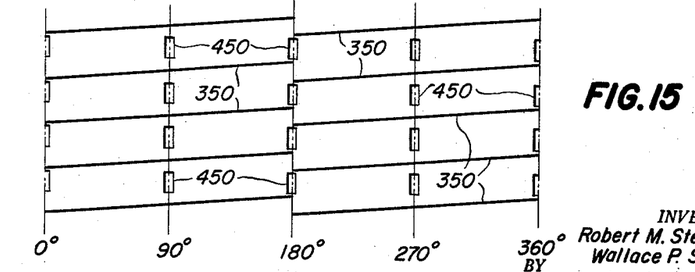
Fig. 15 is a schematic layout of precisely the same deflector arrangement as illustrated in Fig. 14, but shown in combination with a spiral element having flight segments of 180 degrees of rotation.

Fig. 14 is a developed view similar to Fig. 15 schematically illustrating the cooperation of ninety degree flight sectors 302 and deflectors 401 arranged in the staggered relationship referred to.

Fig. 15 in a schematic developed view merely illustrates the inoperativeness of flight segments 350 of one hundred eighty degrees of rotation in conjunction with stops 450 of any kind, and particularly of the vertical pitch variety. Such an arrangement simply does not permit the elevation of a fibrous material by virtue of substantially filling the space between flights with the stops. The fibrous material packs and shortly jams the small openings remaining.

The apparatus which comprises this invention has been designed primarily to accommodate fibrous or agglomerated materials, particularly sugar cane, and is the first operative helical scroll device for such use. As noted above, such fibrous or agglomerated materials are unusually difficult to convey by means of a helical scroll, even with the aid of deflectors, by reason of their property of packing into impervious masses which block the scroll and eventually damage the equipment. The apparatus of this invention has demonstrated that it can handle fibrous material and it therefore follows that it can be applied to soft or non-fibrous materials which are usually easier to convey. It will thus be seen that material such as sugar beets, seeds, wood pulp, shredded fibrous material and like substances can be conveyed by the apparatus of this invention.

It will be apparent that certain modifications and changes will be necessary for adaptation to specific materials from time to time and will be suggested to those skilled in the art. It is intended that all such modifications and changes as come within the true spirit of this invention are intended as being within its scope best defined by the appended claims.

What is claimed as new and is desired to be secured by Letters Patent of the United States is:

1. Apparatus for continuously conveying solid materials upwardly through liquid media, comprising in combination, a cylindrical envelope having an interrupted spiral arrangement of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, and at least one deflector member extending from the envelope into each of the interruptions of the flights, the deflector members that extend into adjacent flight interruptions being longitudinally and radially displaced one from another, and wherein the angle included between the leading edge and the trailing edge of a flight is equal to 180 degrees divided by the number of helices defined by the flights.

2. Apparatus as claimed in claim 1, in which the pitch of the deflectors with respect to a plane normal to the axis of said central shaft is from zero degrees to less than 90 degrees.

3. Apparatus as claimed in claim 1, in which the deflectors are generally ellipsoidal in cross section, the position of the major axis thereof determining the pitch of the deflector.

4. Apparatus as claimed in claim 2, in which the deflectors are provided at their outer ends with flanges, said deflectors being inserted through ports in the envelope and secured to the envelope about said ports by bolts extending through said flanges, thereby rendering said deflectors rotatably adjustable about the axes thereof by the position of said flanges whereby the pitch of said deflectors is variable.

5. Apparatus for continuously conveying solid materials upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, and deflector members extending from the envelope into each of the interruptions of the flights, the deflector members that extend into adjacent flight interruptions being longitudinally and radially displaced one from another, and wherein the angle included between the leading edge and the trailing edge of a flight is equal to 180 degrees divided by the number of helices defined by the flights.

6. Apparatus for continuously conveying solid materials upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, and at least a pair of oppositely disposed deflector members extending from the envelope into each of the interruptions of the flights, the pairs of deflector members that extend into adjacent flight interruptions being longitudinally and radially displaced one from another, and wherein the angle included between the leading edge and the trailing edge of a flight is equal to 180 degrees divided by the number of helices defined by the flights.

7. Apparatus for continuously conveying solid materials upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, and of deflector members extending from the envelope into each of the interruptions of the flights, the deflector members that extend into adjacent flight interruptions being longitudinally and radially displaced one from another, said radial displacement of longitudinally adjacent deflector members being less than 90 degrees, and wherein the angle included between the leading edge and the trailing edge of a flight is equal to 180 degrees divided by the number of helices defined by the flights.

8. Apparatus for continuously conveying solid materials upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, and of a plurality of deflector members extending from the envelope into each of the interruptions of the flights, said deflector members that extend into adjacent flight interruptions being longitudinally and radially displaced one from another and arranged in a plurality of spiral patterns about the cylindrical envelope, and wherein the angle included between the leading edge and the trailing edge of a flight is equal to 180 degrees divided by the number of helices defined by the flights.

9. Apparatus as claimed in claim 8, in which the pitch of said spiral patterns of deflectors is substantially different from the pitch of the spiral arrangements of flights disposed about said central shaft.

10. Apparatus as claimed in claim 8, in which the pitch or angle of attack of the individual deflectors of any given spiral pattern is variable from the pitch with respect to the envelope of the said spiral pattern itself.

11. Apparatus for continuously conveying solid material upwardly through liquid media, comprising in combination, a cylindrical envelope having a plurality of interrupted spiral arrangements of flights disposed about a central shaft journalled for rotation in the envelope, said flights comprising radial segments of substantially less than 180 degrees, and at least one deflector member extending from the envelope into each of the interruptions of said flights, and wherein the angle included between the leading edge and the trailing edge of a flight is equal to 180 degrees divided by the number of helices defined by the flights.

12. Apparatus as claimed in claim 11, in which the deflector members that extend into adjacent flight interruptions are pitched transversely to the pitch of said flights.

13. Apparatus for continuously conveying solid material upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, said flights comprising helical segments, the radial size of which is determined by dividing 180 degrees by the number of interrupted spirals of flights disposed about the shaft, and deflector members extending from the envelope into each of the interruptions of said flights, and being longitudinally and radially displaced one from another and pitched at an angle opposite to that of the flights.

14. Apparatus for continuously conveying solid material upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, said flights comprising helical 90 degree segments, two such flight segments being oppositely disposed on said shaft between interruptions of the spiral arrangements of the flights, and deflectors extending from the envelope into each of the interruptions of the said spiral flight arrangements, and being longitudinally and radially displaced one from another and pitched at an angle opposite to that of the flights.

15. Apparatus for continuously conveying solid material upwardly through liquid media, comprising in combination, an envelope having a plurality of interrupted spiral arrangements of flights disposed about a central shaft journalled for rotation in the envelope, said flights comprising helical segments of at least 30° and substantially less than 180 degrees, a flight segment being disposed on each level between interruptions of the spiral arrangements, wherein the pitch of the spiral arrangements of flights, discounting the interruption spacing, is substantially equal to the pitch of the flight segments and wherein the spacing between adjacent levels of flights coincide with the deflectors extending from the envelope into each of the interruptions of said spiral flight arrangements.

16. Apparatus for continuously conveying solid material upwardly through liquid media comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, said flights comprising helical segments, the radial size of which is determined by dividing 180 degrees by the number of interrupted spirals of flights disposed about the shaft, and the pitch of said flights with respect to a plane normal to the axis of said central shaft being from zero to about from 1:6, where the larger number of the proportion represents radius and the smaller number the elevation at the mean radius of the outer periphery of the flight segment relative to its inner periphery, and deflector members extending from the envelope into each of the interruptions of said flight segments, and being longitudinally and radially displaced one from another and pitched at an angle opposite to that of the flights.

17. Apparatus for continuously conveying solid material upwardly through liquid media, comprising in combination, a cylindrical envelope having a plurality of interrupted spiral arrangements of flights disposed about a central shaft journalled for rotation in the envelope in such manner that the trailing edge of one flight segment and the leading edge of the next flight segment in the spiral arrangement of flights are substantially in alignment in the axial direction of the central shaft and substantially without overlap, said flights comprising helical segments, the radial size of which is determined by dividing 180 degrees by the number of interrupted spirals of flights disposed about the shaft, the pitch of said flights with respect to a plane normal to the axis of said central shaft being from zero to about 30 degrees, and deflector members extending from the envelope into each of the interruptions of said flight segments, and being longitudinally and radially displaced one from another and pitched at an angle opposite to that of the flights.

18. Apparatus for continuously conveying solid materials upwardly through liquid media, comprising in combination, a cylindrical envelope having a plurality of interrupted spiral arrangements of flights disposed about a central shaft journalled for rotation in the envelope, said flights comprising helical segments of substantially less than 180 degrees, the angle included between the leading edge and the trailing edge of a flight being equal to 180 degrees divided by the number of interrupted spirals of flights disposed about the shaft, the adjacent flight segments in any one interrupted spiral arrangement being radially displaced one from another in such a manner that the leading edge of one flight segment is longitudinally spaced from and overlies the trailing edge of the adjacent flight segment of the same spiral arrangement thereof, and deflector members extending from the envelope into each of the interruptions of the flights, the deflector members that extend into adjacent flight interruptions being longitudinally and radially displaced one from another, said radial displacement of longitudinally adjacent deflector members being less than 90 degrees, and said deflectors being pitched at an angle opposite to that of the flights.

19. Apparatus for continuously conveying solid materials upwardly through liquid media, comprising in combination, a cylindrical envelope having a plurality of interrupted spiral arrangements of flights disposed about a central shaft journalled for rotation in the envelope, said flights comprising helical segments of substantially less than 180 degrees, the angle included between the leading edge and the trailing edge of a flight being equal to 180° divided by the number of interrupted spirals of flights disposed about the shaft, a flight segment being disposed on each level between interruptions of the spiral arrangements, the radial length of the flight segments being slightly less than the difference between the outside diameter of the central shaft and the inside diameter of the envelope, and deflector members extending from the envelope into each of the interruptions of the flights, the deflector members that extend into adjacent flight interruptions being longitudinally and radially displaced one from another, at least certain of said deflectors extending inwardly from the envelope to closely adjacent the central shaft.

20. Apparatus for continuously conveying solid materials upwardly through liquid media, comprising in combination, a cylindrical envelope having a plurality of interrupted spiral arrangements of flights disposed about a central shaft journalled for rotation in the envelope, said flights comprising helical segments the radial size of which is determined by dividing 180 degrees by the number of interrupted spirals of flights disposed about the shaft, the pitch of said flights with respect to a plane normal to the axis of the central shaft being from zero to about 30 degrees, and deflector members extending from the envelope into each of the interruptions of the flights, the deflector members that extend into adjacent flight interruptions being longitudinally and radially displaced one from another, said deflector members arranged in a plurality of spiral patterns about the cylindrical envelope, the pitch of said spiral patterns of deflectors being substantially different from the pitch of the spiral arrangements of flights disposed about said central shaft.

21. A spiral conveying device for transporting solid materials upwardly through liquid media, comprising an interrupted spiral arrangement of flights disposed about a central shaft in such manner that the trailing edge of one flight and the leading edge of the next flight in the spiral arrangement of flights are substantially in alignment in the axial direction of the central shaft and substantially without overlap, said flights comprising helical segments of substantially less than 180 degrees, the angle included between the leading edge and the trailing edge of a flight being equal to 180 degrees divided by the number of interrupted spirals of flights disposed about the shaft and having a pitch of from about zero to about 30 degrees with respect to a plane normal to the axis of the central shaft.

22. A spiral conveying device for transporting solid materials upwardly through liquid media, comprising an interrupted spiral arrangement of flights disposed about a central shaft, said flights comprising helical segments the radial size of which is determined by dividing 180 degrees by the number of interrupted spirals of helical segments disposed about the shaft, said segments having a pitch of from zero to about 1:6 where the greater number is the elevation of the mean radius of the flight segments at the outer periphery.

23. A spiral conveying device for transporting solid materials upwardly through liquid media, comprising a plurality of interrupted spiral arrangements of flights disposed about a central shaft, said flights comprising helical 90 degree segments, two such flight segments being oppositely disposed on the said shaft between interruptions of the spiral arrangement of said flight segments.

24. A spiral conveying device for transporting solid materials upwardly through liquid media, comprising a plurality of interrupted spiral arrangements of flights disposed about a central shaft, said flights comprising helical segments the radial size of which is determined by dividing 180 degrees by the number of interrupted spirals of said helical segments disposed about the shaft, a helical segment from each interrupted spiral arrangement thereof being positioned and equally spaced from the helical segment of the other spiral arrangements thereof on any given level of flights whereby the number of flight segments per flight level is equal to the number of spiral arrangements of flights, each of the flight segments being shaped to correspond to an equivalent portion of a continuous helix of the same incremental pitch, the inner ends of the flight segments being fixed by welding to said central shaft.

25. A spiral conveying device for transporting solid materials upwardly through liquid media, comprising a plurality of interrupted spiral arrangements of flights disposed about a central shaft, said flights comprising helical segments, two or more of which are disposed equally spaced apart about said shaft between coinciding interruptions of the spiral arrangements of said flight segments, said flights comprising helical segments of from 30° to 180° and having a pitch of from 0° to 30°.

26. A spiral conveying device for transporting solid materials upwardly through liquid media, comprising a plurality of interrupted spiral arrangements of flights, disposed about a central shaft, said flights comprising helical segments of substantially less than 180 degrees, the adjacent flight segments in any one interrupted spiral arrangement thereof being displaced one from another in such a manner that the leading edge of one flight segment is longitudinally spaced from and overlies the trailing edge of the adjacent flight segment of the same spiral arrangement thereof.

27. Apparatus for continuously conveying solid materials upwardly through liquid media, comprising a deflector extending inwardly from an envelope, said deflector being adapted to extend into an interruption in a spiral arrangement of flights rotatable about a central axis within the envelope, said deflector having a pitch with respect to a plane normal to the said central axis of from zero degrees to less than 90 degrees, in which the deflector is generally ellipsoidal in cross section, the position of the major axis thereof determining its pitch.

28. Apparatus for continuously conveying solid materials upwardly through liquid media, comprising a deflector extending inwardly from an envelope, said deflector being adapted to extend into an interruption in a spiral arrangement of flights rotatable about a central axis within the envelope, said deflector having a pitch with respect to a plane normal to the said central axis of from zero degrees to less than 90 degrees, in which the said deflector is perforate, and the outer end adapted to be releasably secured to the envelope is provided with a closure by means of which fluids may be introduced into or withdrawn from the interior of the envelope.

29. Apparatus for continuously conveying solid materials upwardly through liquid media, comprising a deflector extending inwardly from an envelope, said deflector being adapted to extend into an interruption in a spiral arrangement of flights rotatable about a central axis within the envelope, said deflector having a pitch with respect to a plane normal to the said central axis of from zero degrees to less than 90 degrees, in which the exterior end of the deflector is provided with a flange for releasably securing the deflector to the shell, the flange being provided with a plurality of arcuate slots whereby the pitch of the deflector may be adjusted slightly about bolts extending through side slots into the shell.

30. Apparatus for continuously conveying solid materials upwardly through liquid media, comprising a deflector extending inwardly from an envelope, said deflector being adapted to extend into an interruption in a spiral arrangement of flights rotatable about a central axis within the envelope, said deflector having a pitch with respect to a plane normal to the said central axis of from zero degrees to less than 90 degrees, in which the exterior end of the deflector is provided with a flange for releasably securing the deflector to the shell, the flange being provided with a plurality of arcuate slots equally radially spaced, whereby the pitch of the deflector may be adjusted slightly about bolts extending through said slots into the shell in addition to being adjusted in increments of 360 degrees divided by the number of said equally spaced slots.

31. Apparatus for continuously conveying solid materials upwardly through liquid media, comprising a cylindrical tower having an interrupted spiral arrangement of flights disposed about a central shaft journalled for rotation in the tower, said flights comprising helical segments of substantially less than 180 degrees, the angle included between the leading edge and the trailing edge of a flight being equal to 180 degrees divided by the number of interrupted spirals of flights disposed about the shaft, the adjacent flight segments in any one interrupted spiral of flights being radially displaced one from another in such a manner that the leading edge of one flight segment is longitudinally spaced from and overlies the trailing edge of the adjacent flight segment of the same spiral thereof, deflector members extending from the envelope into each of the interruptions of the flights, the deflector members that extend into the adjacent flight interruptions being longitudinally and radially displaced one from another, said radial displacement of longitudinally adjacent deflector members being less than 90 degrees, perforate material through which liquid media may be withdrawn from the tower circumscribing at least one of the lower flight levels of the spiral flight arrangement, means including a conduit for withdrawing liquid media from the tower through a screened portion, inlet means in the lower end of the tower for introducing solid material to be conveyed upwardly through the liquid media, and discharge means at the upper end of the tower above the uppermost flights of the said spiral arrangement for discharging the material from the tower after it has been conveyed therethrough.

32. Apparatus as claimed in claim 31 in which the perforations of said perforate material are tapered outwardly to a larger diameter than the diameter at the inner end.

33. Apparatus for continuously conveying solid materials upwardly through liquid media, comprising a cylindrical tower having a device journalled for rotation therein, said device comprising a central shaft about which are disposed a pair of interrupted spirals of flights, each of said flights comprising helical segments of 90 degrees, the adjacent flight segments of each said interrupted spiral of the pair being displaced one from another in such a manner that the leading edge of one flight segment is longitudinally spaced from and overlies the trailing edge of the adjacent flight segment, a flight segment of each spiral being fixed on opposite sides of the central shaft at any flight level, the pitch of said flight segments with respect to a plane normal to the axis of the central shaft being from zero to 30 degrees at the mean radius, said longitudinal spacing between the flights of each spiral constituting an interruption and the corresponding interruptions of each of the spirals of flight segments respectively coinciding, and deflector members extending from the envelope into each of the interruptions of flights, the deflector members that extend into adjacent flight interruptions being longitudinally and radially displaced one from another, said radial displacement of longitudinally adjacent deflector members being less than 90 degrees, the pitch of said deflectors with respect to a plane normal to the axis of the central shaft being from about zero degrees to less than 90 degrees, said deflector members being arranged in a plurality of spiral patterns about the tower, perforate material through which liquid media may be withdrawn from the tower circumscribing at least one of the lower flight levels of the pair of interrupted spirals of flights and additional perforate material joined to the first mentioned perforate material underlying the lowermost of the pair of interrupted spirals of flights of said flights, means comprising a pan enclosing and spaced from said perforate materials, at least one conduit extending from said pan for withdrawing liquid media from the tower through said perforated portion, inlet means extending through said pan and said perforate material into the lower end of the tower for conveying solid material upwardly through the liquid media, and discharge means at the upper end of the tower comprising at least one rotating sweep having arms extending through an opening in the tower walls and inwardly to closely adjacent the central shaft, said sweep arms extending from a parallel shaft but external of the tower, said sweep being positioned adjacent the uppermost flights of the spiral arrangement for discharging material from the tower after it has been conveyed therethrough, the entire tower above the pan being supported from a framework, said pan and perforate materials being releasably suspended from the tower within the confines of the framework.

34. Apparatus for continuously conveying solid materials upwardly through liquid media comprising an envelope having an interrupted spiral arrangement of flights disposed about a central shaft journalled for rotation in said envelope, said flights comprising helical segments of substantially less than 180°, the adjacent flight segments of said interrupted spiral of flights being displaced one from another longitudinally so as to form interruptions in said interrupted spiral of flights, deflector members extending from the envelope into interruptions of the spiral arrangement of flights, perforate means through which liquid media may be withdrawn from the envelope adjacent the lowest flight levels of the spiral flight arrangement, means comprising a closure enclosing and spaced from said perforate means attached to the lower end of said envelope, at least one conduit extending from said closure for withdrawing the products of diffusion from the apparatus through said perforate means, inlet means extending into said closure adjacent the perforate means for conveying solid materials into said diffusion apparatus for conveying upwardly through the liquid media, discharge means at the upper end of the apparatus comprising a rotating sweep having arms extending through the envelope adjacent the uppermost flights of the spiral arrangement of flights for discharging material from the apparatus after it has been conveyed therethrough, and scraper means positioned adjacent the perforate means near the inlet to said apparatus for wiping the perforate means during shaft rotation to prevent accumulation of solids thereon.

References Cited in the file of this patent

UNITED STATES PATENTS

| 2,637,666 | Langen | May 5, 1953 |
| 2,663,623 | Anderson | Dec. 22, 1953 |

FOREIGN PATENTS

| 1,090,851 | France | Apr. 5, 1955 |